United States Patent
Ma et al.

(10) Patent No.: US 11,003,556 B2
(45) Date of Patent: May 11, 2021

(54) METHOD, DEVICE AND COMPUTER PROGRAM PRODUCT FOR MANAGING STORAGE SYSTEM

(71) Applicant: EMC IP Holding Company LLC, Hopkinton, MA (US)

(72) Inventors: Chun Ma, Beijing (CN); Geng Han, Beijing (CN); Jibing Dong, Beijing (CN); Hongpo Gao, Beijing (CN); Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 16/216,344

(22) Filed: Dec. 11, 2018

(65) Prior Publication Data
US 2019/0332502 A1 Oct. 31, 2019

(30) Foreign Application Priority Data
Apr. 28, 2018 (CN) .......................... 201810403822.2

(51) Int. Cl.
| G06F 11/00 | (2006.01) |
| G06F 11/20 | (2006.01) |
| G06F 11/10 | (2006.01) |
| G06F 3/06  | (2006.01) |
| G06F 11/34 | (2006.01) |

(52) U.S. Cl.
CPC ........ *G06F 11/2069* (2013.01); *G06F 3/0616* (2013.01); *G06F 3/0644* (2013.01); *G06F 3/0649* (2013.01); *G06F 3/0689* (2013.01); *G06F 11/1092* (2013.01); *G06F 11/2094* (2013.01); *G06F 11/3419* (2013.01); *G06F 2201/81* (2013.01)

(58) Field of Classification Search
CPC .... G06F 3/0616; G06F 3/0644; G06F 3/0649; G06F 3/0689
See application file for complete search history.

(56) References Cited

U.S. PATENT DOCUMENTS

| 9,424,152  | B1 * | 8/2016  | Raut ................... G06F 11/2069 |
| 10,146,456 | B1   | 12/2018 | Gao et al. |
| 10,152,254 | B1   | 12/2018 | Kang et al. |
| 10,346,247 | B1   | 7/2019  | Gao et al. |
| 10,599,357 | B2   | 3/2020  | Gao et al. |
| 2017/0212806 | A1 * | 7/2017 | Kazi ................... G06F 16/2379 |
| 2018/0088857 | A1 * | 3/2018 | Gao ..................... G06F 3/0665 |

* cited by examiner

Primary Examiner — Katherine Lin
(74) Attorney, Agent, or Firm — BainwoodHuang

(57) ABSTRACT

State information of one or more extents in a stripe in a storage system is obtained, the state information indicating whether the extents comprise at least one of a failed extent and an end-of-life extent. A risk level for the stripe is determined based on the state information, the risk level indicating a possibility that data stored in the stripe is lost. In response to the risk level exceeding a first threshold, the storage system is caused to: rebuild data corresponding to the failed extent, and write the data to a sparing extent in a second storage device different from a first storage device where the failed extent resides; and write data corresponding to the end-of-life extent to a swapped extent in a fourth storage device different from a third storage device where the end-of-life extent resides, the fourth storage device being used to replace the third storage device.

12 Claims, 7 Drawing Sheets

METHOD, DEVICE AND COMPUTER PROGRAM PRODUCT FOR MANAGING STORAGE SYSTEM

FIELD

Various implementations of the present disclosure relate to storage management, and more specifically, to a method, device and computer program product for managing a storage system (e.g. Redundant Array of Independent Disks (RAID)).

BACKGROUND

In the current architecture of RAID, a resource pool is used to manage storage spaces of storage devices (e.g. disks). The resource pool divides all disks into disk extents with the same size (e.g. several GBs). The basic manipulation unit of the resource pool is not the entire disk but the resultant disk extent. In other words, addressing, allocating and creating RAID is based on the disk extents in the resource pool.

Mapped Redundant Array of Independent Disks (mapped RAID) is a subclass of RAID. In mapped RAID, a RAID stripe (which is also called a RAID extent) is used to organize disk extents. One RAID stripe includes disk extents distributed across different disks in the resource pool, so that when a disk where a disk extent among the multiple disk extents resides has an error or fails, recovery operations may be executed so as to recover data from a disk where other disk extents locate. Since a storage device in the resource pool might have an error or fail, it becomes a tough technical issue regarding how to recover data, reduce data loss and further improve overall performance of a storage system when a storage device has an error or fails.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, there is provided a method for managing a storage system. The method includes: obtaining state information of one or more extents in a stripe in the storage system, the state information indicating whether the extents include at least one of a failed extent and an end-of-life extent; determining a risk level for the stripe based on the state information, the risk level indicating a possibility that data stored in the stripe is lost; and in response to the risk level exceeding a first threshold, causing the storage system to: rebuild data corresponding to the failed extent, and write the data to a sparing extent in a second storage device different from a first storage device where the failed extent resides; and write data corresponding to the end-of-life extent to a swapped extent in a fourth storage device different from a third storage device where the end-of-life extent resides, the fourth storage device being used to replace the third storage device.

According to a second aspect of the present disclosure, there is provided a device for managing a storage system, the device including: at least one processor; and a memory coupled to the at least one processor, the memory having instructions stored thereon, the instructions, when executed by the at least one processor, causing the device to perform acts. The acts include: obtaining state information of one or more extents in a stripe in the storage system, the state information indicating whether the extents include at least one of a failed extent and an end-of-life extent; determining a risk level for the stripe based on the state information, the risk level indicating a possibility that data stored in the stripe is lost; and in response to the risk level exceeding a first threshold, causing the storage system to: rebuild data corresponding to the failed extent, and write the data to a sparing extent in a second storage device different from a first storage device where the failed extent resides; and write data corresponding to the end-of-life extent to a swapped extent in a fourth storage device different from a third storage device where the end-of-life extent resides, the fourth storage device being used to replace the third storage device.

According to a third aspect of the present disclosure, there is provided a computer program product tangibly stored on a non-transient computer readable medium and including machine executable instructions for executing a method according to the first aspect of the present disclosure.

BRIEF DESCRIPTION OF THE DRAWINGS

Through the more detailed description with reference to the accompanying drawings, features, advantages and other aspects of the implementations of the present disclosure will become more apparent. Several implementations of the present disclosure are illustrated schematically and are not intended to limit the present disclosure. In the drawings.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
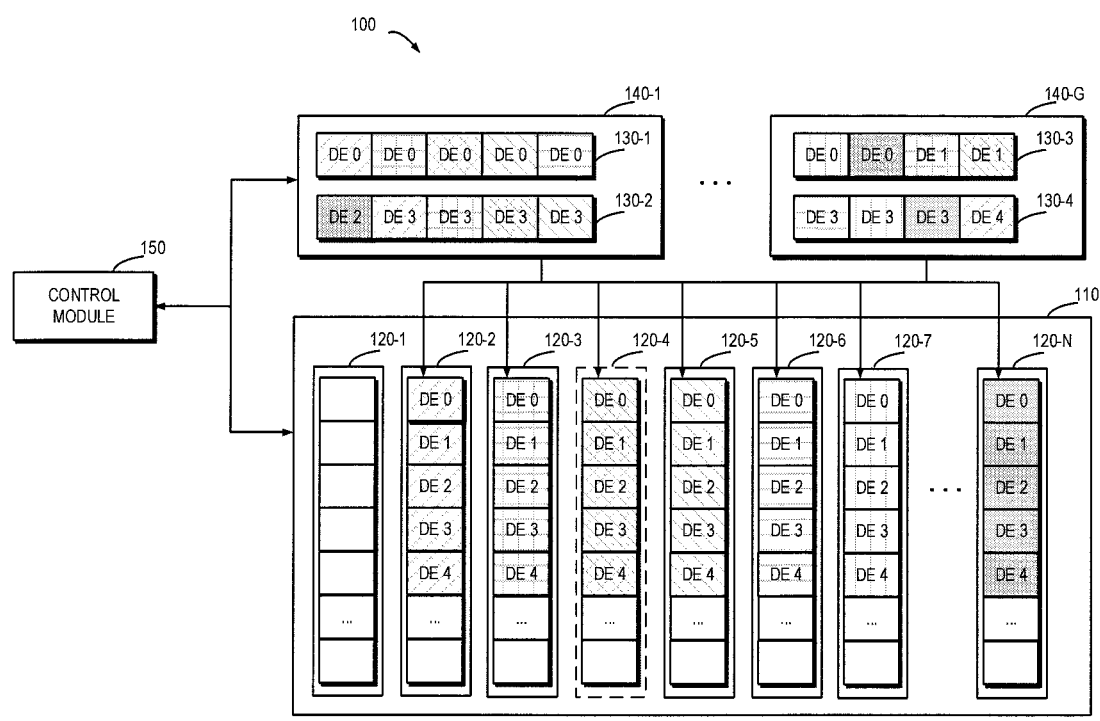
FIG. 1 illustrates a schematic view of a storage system in which a method of the present disclosure may be implemented.

In the context of the present disclosure, the storage system may be a mapped RAID storage system. FIG. 1 shows a schematic view of a storage system 100 in which a method of the present disclosure may be implemented.

The storage system 100 includes a resource pool 110. The resource pool 110 includes storage devices 120-1 to 120-N (collectively referred to as "a storage device 120" below), wherein N is a natural number greater than 1 As described above, the resource pool 110 is used to manage a storage space of the storage device 120. The resource pool 110 divides the storage device 120 into multiple extents with the same size (e.g. several GBs), which are then used as a basic operational unit of the storage system 100. As depicted, taking the storage device 120-1 for example, the storage device 120-1 may be divided into multiple extents. Similarly, other storage device 120 may be divided into the same or a different number of extents as the storage device 120-1.

These extents may be organized into multiple stripes 130. One stripe 130 may consist of multiple extents distributed across different storage devices 120 in the resource pool. As depicted, taking a stripe 130-1 for example, the stripe 130-1 may be composed of: an extent DE 0 on a storage device 120-2, an extent DE 0 on a storage device 120-3, an extent DE 0 on a storage device 120-4, an extent DE 0 on a storage device 120-5, and an extent DE 0 on a storage device 120-6. Similarly, other stripes 130 may be composed of the same or a different number of extents distributed across different storage devices 120, as the stripe 130-1. It should be understood although FIG. 1 shows only 4 stripes for the illustration purpose, the number of stripes is not limited to this and may be any natural number greater than 1.

Since extents used in the stripe 130 are distributed across different storage devices 120 in the resource pool, when a storage device 120 where an extent in the stripe 130 resides has an error or fails, the storage system 130 may execute recovery operations to recover data from storage devices 120 where other extents in the stripe 130 resides.

In some implementations, sub storage systems 140-1 to 140-G (collectively referred to as a sub storage system 140 below) each may be implemented by the stripes 130 having the same width, wherein G is a natural number greater than 1. Here, the stripes 130 having the same width means that the stripes 130 each are composed of the same number of extents. For example, as depicted, the stripe 130-1 and a stripe 130-2 each include 5 extents, while a stripe 130-3 and a stripe 130-4 each include 4 extents. In this case, the stripe 130-1 and the stripe 130-2 may form the sub storage system 140-1, while the stripe 130-3 and the stripe 130-4 may form the sub storage system 140-G Data recovery operations may be executed on different sub storage systems 140 separately or jointly, specific details of which will be described below. It should be understood although as shown in FIG. 1, the sub storage system includes 2 stripes for the illustration purpose, the number of extents is not limited to this and may be any natural number that is not less than 1.

The storage system 100 further includes a control module 150. In some implementations, the control module 150 may be implemented in a control path of the storage system 100. However, the implementation of the control module 150 is not limited to this. For example, the control module 150 may be implemented in a data path of the storage system 100, or implemented in both the control path and the data path of the storage system 100. The control module 150 may be used to manage the storage system 100. For example, the control module 150 may schedule background operations (e.g. rebuilding, copying, verifying, etc.) for the storage device 120 in the storage system 100 so as to guarantee data reliability.

Specifically, in some implementations, if the storage device 120 has an error, then the storage device 120 will be marked as end of life (EOL). For example, when the number or severity of errors of the storage device 120 reaches a predefined threshold, the storage device 120 will be marked as end of life. As depicted, the storage device 120-2 is depicted as an EOL storage device.

When the control module 150 detects end of life on the storage device 120, the control module 150 will schedule a proactive copy operation for the storage device 120. In the proactive copy operation, the storage system 100 will select a sparing storage device (also referred to as a swapped storage device) from the resource pool. As depicted, the storage device 120-1 is shown as a swapped storage device. The storage system 100 migrates data in extents in an EOL storage device to the selected swapped storage device. Upon completion of the migration, the selected storage device will replace the EOL storage device. For example, the storage system 100 may migrate data in the storage device 120-2 to the storage device 120-1 and replace the storage device 120-2 by the storage device 120-1.

In addition, when the storage device 120 fails or is broken, the control module 150 may schedule a rebuild operation for the storage device 120. As depicted, the storage device 120-4 is shown as a failed storage device. In each storage device 120 in the resource pool, a given number of extents will be reserved as sparing extents. In the rebuild operation, the storage system 100 will select sparing extents to rebuild data in the failed storage device. The sparing extents are selected in conformity with an extent distribution policy, i.e. extents in the same stripe 130 are distributed across different storage devices 120 in the resource pool. For example, data in the extents DE 0 to DE 4 in the storage device 120-4 may be rebuilt in sparing extents in different storage devices 120-7, 120-5, 120-N, 120-6 and 120-1.

In some implementations, background operations scheduled by the control module 150 are executed in series and have priorities. When there is a need to run a higher-priority background operation, a lower-priority background operation that is already running must pause, and will resume after the higher-priority background operation is completed. In example implementations of the storage system 100, the rebuild operation has a higher priority than the proactive copy operation. This is because the data reliability depends on: 1) reliability of a physical storage device; 2) data redundancy. Many types of errors may reduce the data reliability. Some errors might even cause data loss. Therefore, when an error happens, the storage system 100 will attempt to recover lost data.

Traditionally, the storage system recovers lost data only based on data redundancy so as to improve the data reliability. Therefore, the storage system executes a rebuild operation first, and a proactive copy operation will not start until the rebuild operation finishes. In this case, when the storage system is executing the proactive copy operation on an EOL storage device in the resource pool, if a further storage device fails, then the ongoing proactive copy operation has to pause and the rebuild operation for the failed storage device will start. The suspended proactive copy operation will not resume until the rebuild operation finishes. For example, if the storage device 120-4 fails when a proactive copy operation is being executed on the storage device 120-1, then the proactive copy operation will pause until a rebuild operation on the storage device 120-4 is completed.

However, the traditional storage system fails to consider the impact of errors of a physical storage device on data redundancy. Specifically, a stripe with the highest data-lost risk does not include extents in a failed storage device only, but includes extents both in the failed storage device and in an EOL storage device. For example, the stripe 130-1 includes not only extents in the failed storage device 120-4 but also extents in the EOL storage device 120-2.

The traditional storage system cannot distinguish the difference between these two types of stripes. For a stripe including failed extents and EOL extents, since background operations are processed serially, a rebuild operation that is executed first will read data from multiple extents comprised in this stripe so as to rebuild data to a sparing extent. After the rebuild operation, a proactive copy operation will, once again, read data from multiple extents comprised in this stripe so as to copy data to a swapped extent. For example, 5 extents in the stripe 130-1 are read both in the rebuild operation and in the proactive copy operation. In this case, EOL extents in this stripe are read twice. The two reads increases the load of a storage device where an EOL extent resides, and might hasten the storage device to fail.

To at least partially solve the foregoing problems and one or more of other potential problems, example implementations of the present disclosure propose a solution for managing a storage system. The solution defines a data-lost risk level for a stripe based on both data redundancy and physical storage device reliability. In addition, when a risk level of a stripe is determined to exceed a predefined threshold, the solution executes a rebuild-copy operation on the stripe which combines the rebuild operation and the proactive copy operation. In the rebuild-copy operation, data is read from multiple extents comprised in the stripe so as to rebuild data in a failed extent to a sparing extent and copy data in an EOL extent to a swapped extent.

In this way, extra reads from an EOL storage device may be avoided. Therefore, the possibility of data loss may be reduced, time spent in rebuilding and copying extents in a stripe may be decreased, and further the overall performance of the storage system may be improved.

Figure 2:
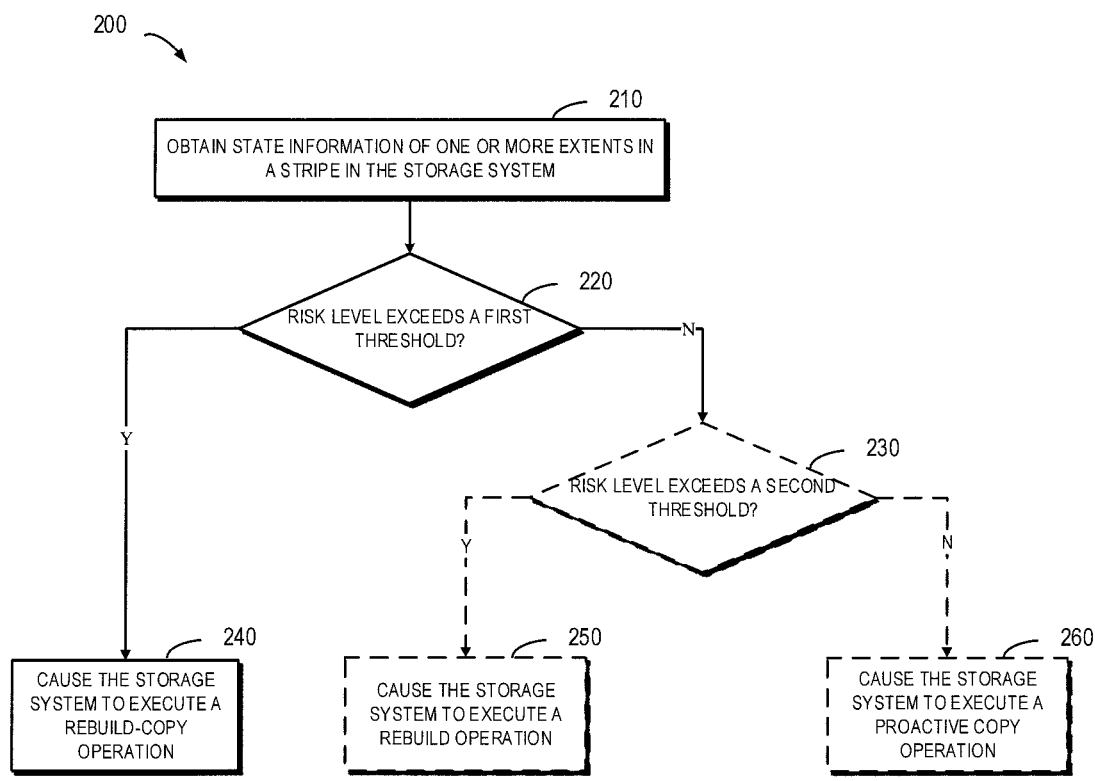
FIG. 2 illustrates a flowchart of a method for managing a storage system according to implementations of the present disclosure.

FIG. 2 shows a flowchart of a method 200 for managing a storage system according to implementations of the present disclosure. For example, the method 200 may be executed by the control module 150. It should be understood that the method 200 may further include an additional step that is not shown and/or omit a step that has been shown, and the scope of the present disclosure is not limited in this regard.

At 210, the control module 150 obtains state information of extents in the stripe 130 in the storage system 100. The state information may indicate whether the extents include at least one of a failed extent and an EOL extent. In some implementations, state information of extents in the stripe 130 may be stored in a record. When the storage device 120 detects the end-of-life or a failure of itself, the storage system 100 may mark an extent of the stripe 130 which resides on the EOL or failed storage device 120 as end-of-life or failed in the record that records the state information of the stripe 130. Then, the control module 150 may obtain the state information from the record at a predefined time interval. However, the way that the control module 150 obtains the state information is not limited to this. For example, when the storage device 120 detects the end-of-life or a failure of itself, the storage system 100 may use events, notifications or any other ways to cause the control module 150 to obtain the state information.

Next, the control module 150 may determine a risk level for the stripe 130 based on the obtained state information. The risk level indicates the possibility that data stored in the stripe 130 is lost. As described above, data reliability depends on data redundancy and storage device reliability. From the perspective of data redundancy, data with redundancy has a lower data-lost risk. From the storage device's point of view, data stored in a more reliable storage device has a lower data-lost risk. For the stripe 130, its data-lost risk level depends on the data redundancy and storage device of extents comprised in the stripe 130. Therefore, the control module 150 may determine a data-lost risk level depending on whether the stripe 130 includes a failed extent and/or an EOL extent. It may be understood that when both data and storage device reliability are taken into consideration, the data-lost risk for the stripe 130 may be evaluated more accurately.

Specifically, at 220, the control module 150 may determine whether the risk level exceeds a first threshold. In some implementations, when the state information indicates the stripe 130 includes both a failed extent and an EOL extent, the control module 150 may determine the risk level of the stripe 130 exceeds the first threshold (high risk level). For example, the stripe 130-1 includes both a failed extent DE 0 in the failed storage device 120-4 and an EOL extent DE 0 in the EOL storage device 120-2, so the stripe 130-1 may be determined as having a risk level exceeding the first threshold.

When the control module 150 determines the risk level does not exceed the first threshold, at 230, the control module 150 may further determine whether the risk level exceeds a second threshold. Where the state information indicates the stripe 130 only includes the failed extent, the control module 150 may determine the risk level of the stripe 130 is below the first threshold and exceeds the second threshold (mid risk level). For example, the stripe 130-3 only includes a failed extent DE 1 in the failed storage device 120-4, so the stripe 130-3 may be determined as having a risk level below the first threshold and exceeding the second threshold.

When the state information indicates the stripe 130 only includes the EOL extent, the control module 150 may determine the risk level of the stripe 130 is below than the second threshold (low risk level). For example, the stripe 130-4 only includes an EOL extent DE 4 in the EOL storage device 120-2, so the stripe 130-4 may be determined as having a risk level below the second threshold. In addition, when the state information indicates the stripe 130 includes neither the failed extent nor the EOL extent, the control module 150 may determine the stripe 130 has no risk.

When the stripe 130 has a risk, the control module 150 may cause the storage system to execute the rebuild-copy operation, the rebuild operation and the proactive copy operation respectively. At 240, when the risk level is determined to exceed the first threshold, the control module 150 causes the storage system to rebuild data corresponding to the failed extent based on other available extents in the stripe 130, write the rebuilt data to a sparing extent in a storage device (referred to as "a second storage device") different from a storage device (referred to as "a first storage device") where the failed extent resides, and write data corresponding to the EOL extent to a swapped extent in a swapped storage device (referred to as "a fourth storage device") different from a storage device (referred to as "a third storage device") where the EOL extent resides. In this case, the fourth storage device may replace the third storage device.

Thereby, when the storage system 100 performs data recovery to the stripe 130 with a high risk level, the storage system 100 will read data from the EOL extent in the EOL storage device so as to support the rebuilding of data of the failed extent. In the meanwhile, the data read from the EOL storage device will be copied to the swapped extent in the swapped storage device. Therefore, data are only read once from the EOL storage device, and the rebuild operation and the proactive copy operation are performed concurrently. As a result, the reliability of the stripe 130 can be recovered without extra IO on the EOL extent. Further, time for recovering data can be reduced, and the risk of data loss can be decreased more quickly.

At 250, when the risk level is determined to be below the first threshold and exceed the second threshold, the control module 150 causes the storage system to rebuild data corresponding to the failed extent based on other available extents in the stripe 130, and to write the rebuilt data to a sparing extent in the second storage device different from the first storage device where the failed extent resides. At 260, when the risk level is determined to be below the second threshold, the control module 150 causes the storage system to write data corresponding to the EOL extent to a swapped extent in the fourth storage device different from the third storage device where the EOL extent resides. In this case, the fourth storage device may replace the third storage device.

In the traditional storage system, the rebuild operation and the proactive copy operation will twice read data from the EOL storage device to rebuild data in the failed storage device and copy data to the swapped storage device. This causes extra data input and output which may hasten the EOL storage device to deteriorate, and there exists a long high risk level time window between the rebuild operation and the proactive copy operation. However, the present disclosure may recover the data reliability of a stripe with the highest data-lost risk level, so as to avoid extra data IO on the EOL storage device which may hasten the storage device to deteriorate.

Figure 3A:
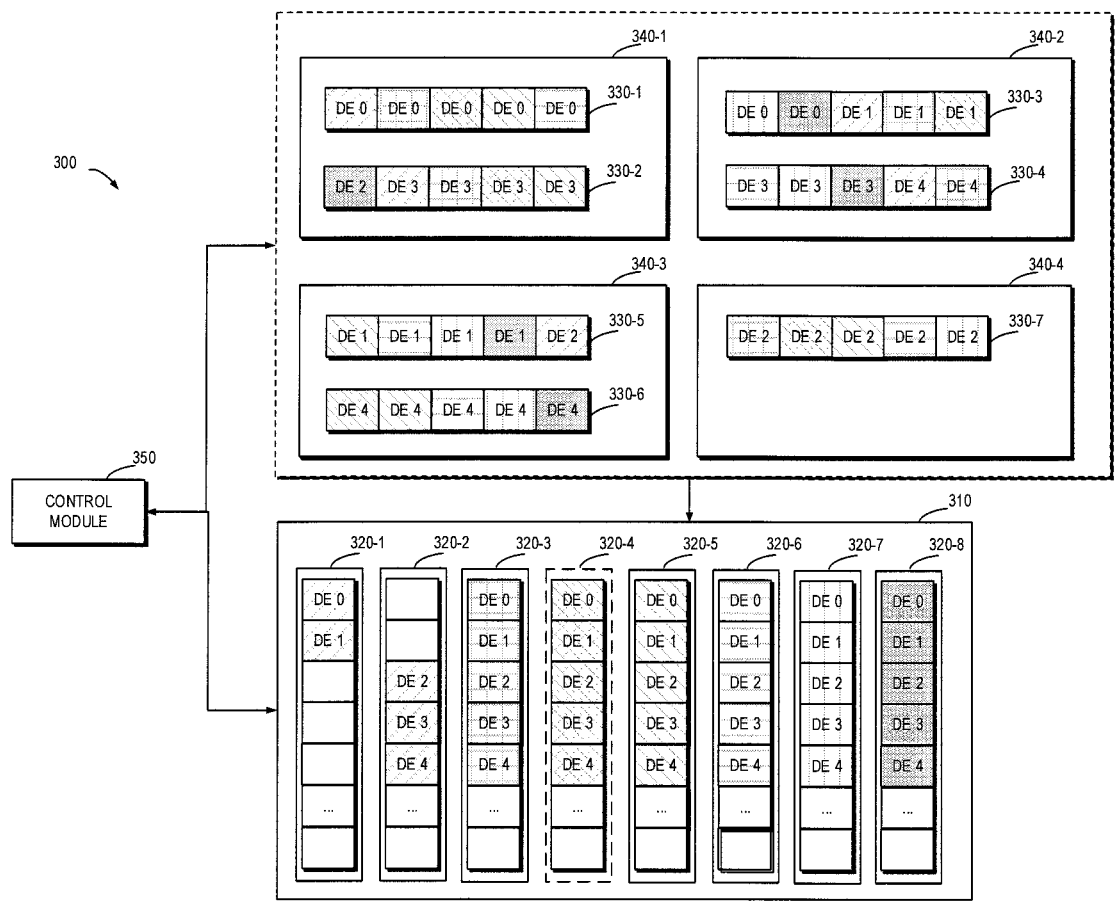
FIGS. 3A to 3D each illustrate a schematic view for managing a storage system according to implementations of the present disclosure.

A specific example of the control module 150 performing the rebuild-copy operation, the rebuild operation and the copy operation to the stripe 130 is described with reference to FIGS. 3A to 3D. FIG. 3A shows a schematic view of an initial state of a storage system according to implementations of the present disclosure. The storage system 300 is an example implementation of the storage system 100. Specifically, the storage system 300 includes a resource pool 320. The resource pool 320 includes 8 storage devices, i.e. 310-1 to 320-8 (collectively referred to as "storage device 320" below), among which the storage device 320-1 is a newly swapped storage device and the storage device 320-4 is a failed storage device. 4 sub storage systems 340-1 to 340-4 (collectively referred to as "sub storage system 340" below) are created on the resource pool 310. The sub storage system 340-1 is composed of a stripe 330-1 and a stripe 330-2. The sub storage system 340-2 is composed of a stripe 330-3 and a stripe 330-4. The sub storage system 340-3 is composed of a stripe 330-5 and a stripe 330-6. In addition, the sub storage system 340-4 is composed of a stripe 330-7.

As depicted, since the stripe 330-2 includes both an extent DE 3 in the EOL storage device 320-2 and an extent DE 3 in the failed storage device 320-4, a control module 350 may determine the risk level of the stripe 330-2 exceeds a first threshold.

In addition, since the stripe 330-1 includes an extent DE 0 in the failed storage device 320-4, the stripe 330-3 includes an extent DE 1 in the failed storage device 320-4, the stripe 330-6 includes an extent DE 4 in the failed storage device 320-4, and the stripe 330-7 includes an extent DE 2 in the failed storage device 320-4, the control module 350 may determine the risk level of each of the stripes 330-1, 330-3, 330-6 and 330-7 is below the first threshold and exceeds a second threshold.

Further, since the stripe 330-4 includes an extent DE 4 in the EOL storage device 320-2, and the stripe 330-5 includes an extent DE 2 in the EOL storage device 320-2, the control module 350 may determine the risk level of each of the stripes 330-4 and 330-5 is below the second threshold. At this point, the control module 350 may schedule a data recovery operation to the stripe on the basis of the determined risk level.

Recovery for High Risk Level Stripe

Figure 3B:
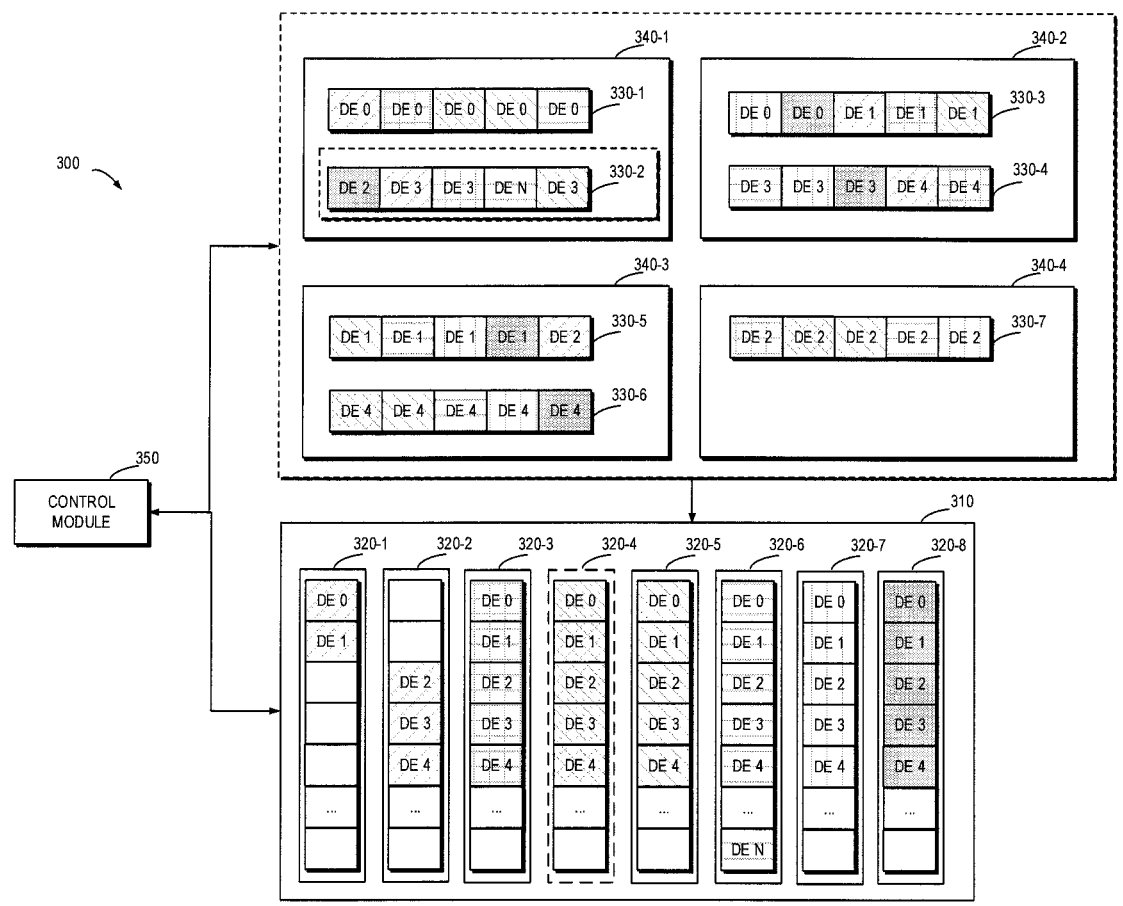

As shown in FIG. 3B, the control module 350 causes the storage system 300 to read data from all available extents of the stripe 330-2 other than the extent DE 3 locating in the failed storage device 320-4, then to perform a rebuild operation to the stripe 330-2 so as to rebuild data in the extent DE 3 of the stripe 330-2 which resides in the failed storage device 320-4 based on available extents of the stripe 330-2, and to write the rebuilt data to a sparing extent DE N in the storage device 320-6 different from the failed storage device 320-4. In the meanwhile, the control module 350 causes the storage system 100 to perform a proactive copy operation to the stripe 330-2, so as to write data in the extent DE 3 in the EOL storage device 320-2 to a swapped extent DE 3 in the swapped storage device 320-1.

Recovery for Mid Risk Level Stripe

Figure 3C:
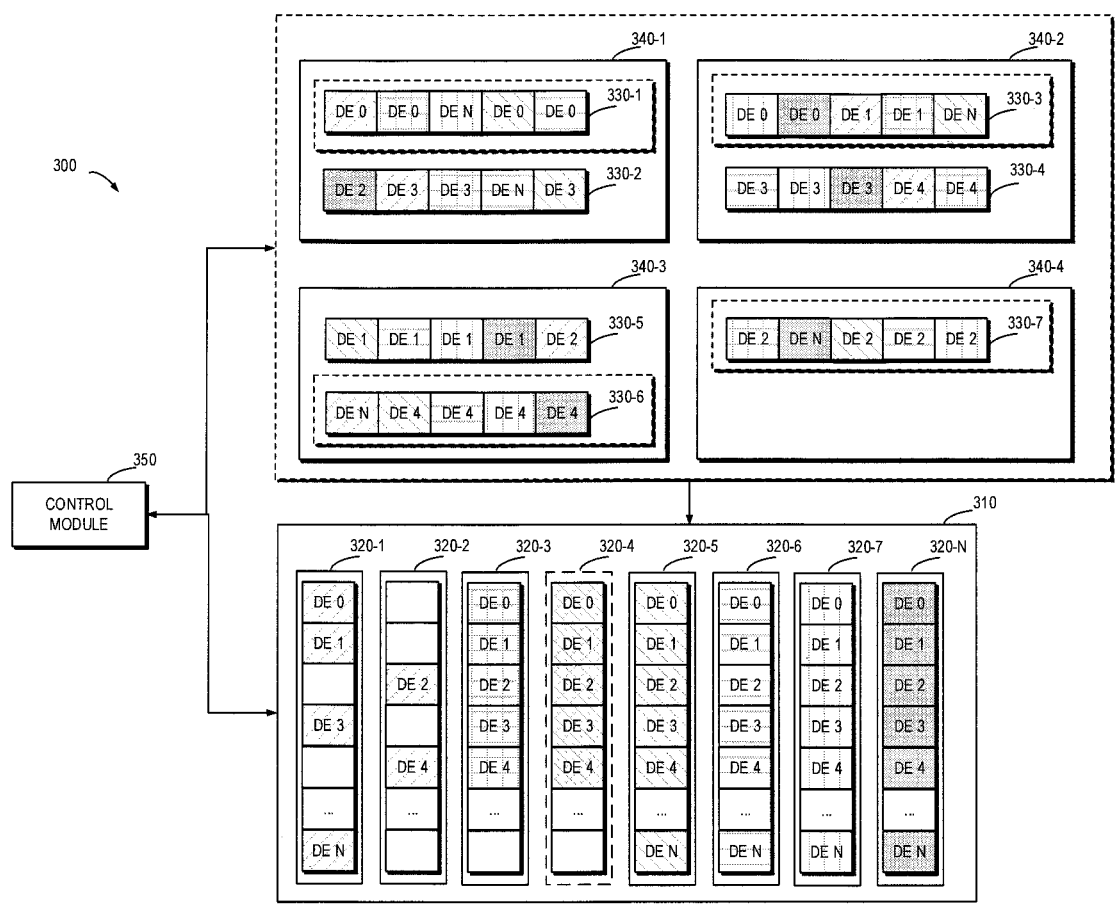

As shown in FIG. 3C, for the stripe 330-1, the control module 350 causes the storage system 300 to read data from all available extents of the stripe 330-1 other than the extent DE 0 locating in the failed storage device 320-4, then to perform a rebuild operation to the stripe 330-1 so as to rebuild data in the extent DE 0 of the stripe 330-1 which resides in the failed storage device 320-4 based on available extents of the stripe 330-1, and to write the rebuilt data to a sparing extent DE N in the storage device 320-6 different from the failed storage device 320-4.

Similarly, for the stripe 330-3, the control module 350 causes the storage system 300 to rebuild data in the extent DE 1 of the stripe 330-3 which resides in the failed storage device 320-4, and to write the rebuilt data to a sparing extent DE N in the storage device 320-5. Further, for the stripe 330-6, the control module 350 causes the storage system 300 to rebuild data in the extent DE 4 of the stripe 330-6 which resides in the failed storage device 320-4, and to write the rebuilt data to a sparing extent DE N in the storage device 320-1. Still further, for the stripe 330-7, the control module 350 causes the storage system 300 to rebuild data in the extent DE 2 of the stripe 330-7 which resides in the failed storage device 320-4, and to write the rebuilt data to a sparing extent DE N in the storage device 320-8.

Recovery for Low Risk Level Stripe

Figure 3D:
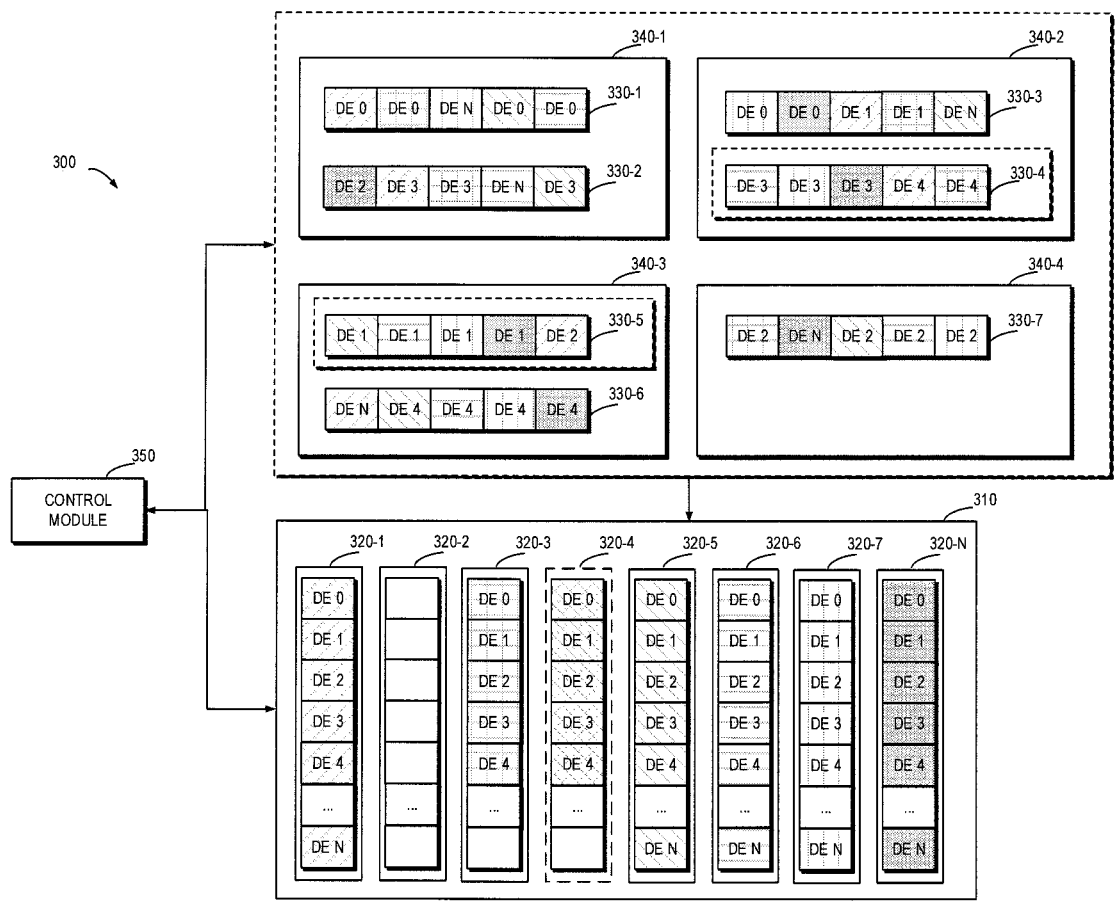

As shown in FIG. 3D, for the stripe 330-4, the control module 350 causes the storage system 300 to write data in the extent DE 4 of the stripe 330-4 which resides in the EOL storage device 320-2 to a swapped extent DE 4 in the swapped storage device 320-1. Similarly, for the stripe 330-5, the control module 350 causes the storage system 300 to write data in the extent DE 2 of the stripe 330-5 which resides in the EOL storage device 320-2 to a swapped extent DE 2 in the swapped storage device 320-1.

In some implementations, for fully using hardware resources of the storage system, all sub storage systems may execute data recovery operations concurrently. In this case, data recovery for stripes is not performed according to risk levels of the stripes in the entire storage system, but performed according to risk levels of the stripes in a single sub storage system. For example, a stripe with the highest risk level in the sub storage system 340-1 is the stripe 330-2 (having a high risk level), while a stripe with the highest risk level in the sub storage system 340-2 is the stripe 330-3 (having a mid risk level). Although the risk level of the stripe 330-2 exceeds that of the stripe 330-3, since the stripe 3302 and the stripe 330-3 are the stripe with the highest risk level in the sub storage system 340-1 and the sub storage system 340-2 respectively, data recovery operations for the stripe 330-2 and the stripe 330-3 may run concurrently.

By means of the solution of the present disclosure, when the storage system has both an EOL storage device and a failed storage device, the data lost risk of the storage system can be reduced, because time for recovering the reliability of the storage system is reduced. In addition, the solution of the present disclosure can reduce time spent by background operations, because partial work of rebuild and proactive copy operations is merged into a rebuild-copy operation. Further, since rebuild and proactive copy operations use data read from the EOL storage device, the solution of the present disclosure can reduce data reads, thereby avoiding burdening the load of the EOL disk.

Figure 4:
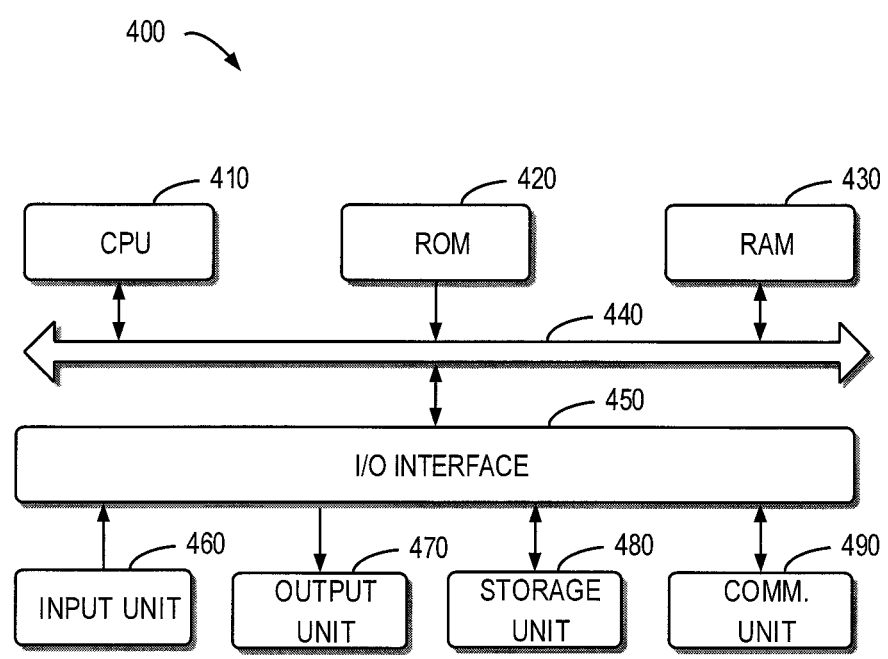
FIG. 4 illustrates a block diagram of a device for managing a storage system according to example implementations of the present disclosure.

FIG. 4 shows a schematic block diagram of an example device 400 which is applicable to implement implementations of the present disclosure. For example, the control module 150 as shown in FIG. 1 may be implemented by the device 400. As depicted, the device 400 includes a central process unit (CPU) 410, which can execute various suitable actions and processing based on the computer program instructions stored in the read-only memory (ROM) 420 or computer program instructions loaded in the random-access memory (RAM) 430 from a storage unit 480. The RAM 430 can also store all kinds of programs and data required by the operations of the device 400. CPU 410, ROM 420 and RAM 430 are connected to each other via a bus 440. The input/output (I/O) interface 450 is also connected to the bus 440.

A plurality of components in the device 400 is connected to the I/O interface 450, including: an input unit 460, such as keyboard, mouse and the like; an output unit 470, e.g., various kinds of display and loudspeakers etc.; a storage unit 480, such as magnetic disk and optical disk etc.; and a communication unit 490, such as network card, modem, wireless transceiver and the like. The communication unit 490 allows the device 400 to exchange information/data with other devices via the computer network, such as the Internet, and/or various telecommunication networks.

The above described procedures and processes, such as the method 200, can also be executed by the processing unit 410. For example, in some implementations, the method 200 can be implemented as a computer software program tangibly included in the machine-readable medium, e.g., the storage unit 480. In some implementations, the computer program can be partially or fully loaded and/or mounted to the device 400 via ROM 420 and/or the communication unit 490. When the computer program is loaded to the RAM 430 and executed by the CPU 410, one or more steps of the above described method 200 can be implemented.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible device that maintains and stores instructions utilized by the instruction executing devices. The computer-readable storage medium can be, but not limited to, such as electrical storage device, magnetic storage device, optical storage device, electromagnetic storage device, semiconductor storage device or any appropriate combinations of the above. More specific examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to respective computing/processing device, or to an external computer or external storage via the network, such as the Internet, local area network, wide area network and/or wireless network. The network can include copper-transmitted cable, optical fiber transmission, wireless transmission, router, firewall, switch, gateway computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via the Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions specified in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions specified in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions specified in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or instructions, wherein the module and the part of program segment or instructions include one or more executable instructions for performing specified logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a dedicated hardware-based system for executing specified functions or actions, or by a combination of dedicated hardware and computer instructions.

It should be understood that a failed extent and an end-of-life extent are examples of critical extents where data is at risk. In particular, when a stripe includes a failed extent and/or an end-of-life extent (i.e., one or more critical extents), data stored in the stripe may be lost and remedial action (e.g., rebuilding, pro-active copying, etc.) should be taken to safeguard the data.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, the method comprising:
    obtaining state information of one or more extents in a single stripe in the storage system, the state information indicating whether the extents comprise at least one of a failed extent and an end-of-life extent, wherein obtaining the state information comprises obtaining, at a predefined time interval, the state information from a record storing the state information;
    determining a risk level for the stripe based on the state information, the risk level indicating a possibility that data stored in the stripe is lost, wherein determining the risk level includes, in response to the state information indicating the extents comprise both a failed extent and an end-of-life extent, determining the risk level exceeds a first threshold; and
    in response to the risk level exceeding the first threshold, causing the storage system to:
        rebuild data corresponding to the failed extent, and write the data to a sparing extent in a second storage device different from a first storage device where the failed extent resides, wherein the first storage device comprises a failed storage device; and
        write data corresponding to the end-of-life extent to a swapped extent in a fourth storage device different from both the second storage device and a third storage device where the end-of-life extent resides, the third storage device comprising a storage device that is marked as end-of-life that is different from the first storage device, and the fourth storage device being used to replace the third storage device;
    wherein responsive to the risk level exceeding the first threshold, the storage system is caused to rebuild the data corresponding to the failed extent and write the rebuilt data to the sparing extent in the second storage device concurrently with the write of the data corresponding to the end-of-life extent to the swapped extent in the fourth storage device.

2. The method according to claim 1, wherein determining the risk level further comprises:
    in response to the state information indicating the extents only comprise a failed extent, determining the risk level is below the first threshold and exceeds a second threshold; and in response to the state information indicating the extents only comprise an end-of-life extent, determining the risk level is below the second threshold.

3. The method according to claim 1, further comprising:
in response to the risk level being below the first threshold and exceeding a second threshold, causing the storage system to rebuild data corresponding to the failed extent and write the data to the sparing extent.

4. The method according to claim 1, further comprising:
in response to the risk level being below a second threshold, causing the storage system to write data corresponding to the end-of-life extent to the swapped extent.

5. A device for managing a storage system, comprising:
at least one processor;
a memory coupled to the at least one processor, the memory having instructions stored thereon, the instructions, when executed by the at least one processor, causing the device to perform acts, the acts comprising:
obtaining state information of one or more extents in a single stripe in the storage system, the state information indicating whether the extents comprise at least one of a failed extent and an end-of-life extent, wherein obtaining the state information comprises obtaining, at a predefined time interval, the state information from a record storing the state information;
determining a risk level for the stripe based on the state information, the risk level indicating a possibility that data stored in the stripe is lost, wherein determining the risk level includes, in response to the state information indicating the extents comprise both a failed extent and an end-of-life extent, determining the risk level exceeds the first threshold; and
in response to the risk level exceeding the first threshold, causing the storage system to:
rebuild data corresponding to the failed extent, and write the data to a sparing extent in a second storage device different from a first storage device where the failed extent resides, wherein the first storage device comprises a failed storage device; and
write data corresponding to the end-of-life extent to a swapped extent in a fourth storage device different from both the second storage device and a third storage device where the end-of-life extent resides, the third storage device comprising a storage device that is marked as end-of-life that is different from the first storage device, and the fourth storage device being used to replace the third storage device;
wherein responsive to the risk level exceeding the first threshold, the storage system is caused to rebuild the data corresponding to the failed extent and write the rebuilt data to the sparing extent in the second storage device concurrently with the write of the data corresponding to the end-of-life extent to the swapped extent in the fourth storage device.

6. The device according to claim 5, wherein determining the risk level further comprises:
in response to the state information indicating the extents only comprise a failed extent, determining the risk level is below the first threshold and exceeds a second threshold; and
in response to the state information indicating the extents only comprise an end-of-life extent, determining the risk level is below the second threshold.

7. The device according to claim 5, the acts further comprising:
in response to the risk level being below the first threshold and exceeding a second threshold, causing the storage system to rebuild data corresponding to the failed extent and write the data to the sparing extent.

8. The device according to claim 5, the acts further comprising:
in response to the risk level being below a second threshold, causing the storage system to write data corresponding to the end-of-life extent to the swapped extent.

9. A computer program product having a non-transitory computer readable medium which stores a set of instructions to manage a storage system; the set of instructions, when carried out by computerized circuitry, causing the computerized circuitry to perform a method of:
obtaining state information for a set of extents in a single stripe in the storage system, the state information indicating whether the extents comprise at least one of a failed extent and an end-of-life extent, wherein obtaining the state information comprises obtaining, at a predefined time interval, the state information from a record storing the state information;
determining a risk level for the stripe based on the state information, the risk level indicating a possibility that data stored in the stripe is lost, wherein determining the risk level includes, in response to the state information indicating the extents comprise both a failed extent and an end-of-life extent, determining the risk level exceeds a first threshold; and
in response to the risk level exceeding the first threshold, causing the storage system to:
rebuild data corresponding to the failed extent, and write the data to a sparing extent in a second storage device different from a first storage device where the failed extent resides, wherein the first storage device comprises a failed storage device; and
write data corresponding to the end-of-life extent to a swapped extent in a fourth storage device different from both the second storage device and a third storage device where the end-of-life extent resides, the third storage device comprising a storage device that is marked as end-of-life that is different from the first storage device, and the fourth storage device being used to replace the third storage device;
wherein responsive to the risk level exceeding the first threshold, the storage system is caused to rebuild the data corresponding to the failed extent and write the rebuilt data to the sparing extent in the second storage device concurrently with the write of the data corresponding to the end-of-life extent to the swapped extent in the fourth storage device.

10. The method of claim 1, wherein responsive to the risk level exceeding the first threshold the data in the end-of-life extent is read only once to perform both of the following:
rebuilding the data corresponding to the failed extent and writing the rebuild data to the sparing extent; and
writing the data corresponding to the end-of-life extent to the swapped extent.

11. The method according to claim 10, wherein rebuilding the data corresponding to the failed extent comprises rebuilding the data corresponding to the failed extent based on other available extents in the stripe.

12. The method according to claim 11, wherein the other available extents in the stripe include the end-of-life extent.

* * * * *